(12) United States Patent
Azaria et al.

(10) Patent No.: US 12,417,152 B2
(45) Date of Patent: Sep. 16, 2025

(54) SYSTEM AND A METHOD FOR GENERATING LIVE VM IMAGES WITH AN EXTENDED RECOVERY RANGE

(71) Applicant: EMC IP Holding Company LLC, Hopkinton, MA (US)

(72) Inventors: Nadav Azaria, Meitar (IL); Jehuda Shemer, Kfar Saba (IL); Saar Cohen, Mishmeret (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 18/632,166

(22) Filed: Apr. 10, 2024

(65) Prior Publication Data

US 2024/0256402 A1 Aug. 1, 2024

Related U.S. Application Data

(63) Continuation of application No. 16/804,903, filed on Feb. 28, 2020, now Pat. No. 11,971,788.

(51) Int. Cl.
*G06F 11/14* (2006.01)
*G06F 9/455* (2018.01)

(52) U.S. Cl.
CPC ...... *G06F 11/1469* (2013.01); *G06F 9/45558* (2013.01); *G06F 11/1448* (2013.01); *G06F 2009/45562* (2013.01); *G06F 2009/45575* (2013.01); *G06F 2009/45579* (2013.01)

(58) Field of Classification Search
CPC ............ G06F 11/1469; G06F 9/45558; G06F 11/1448; G06F 2009/45562; G06F 2009/45575; G06F 2009/45579; G06F 11/1446; G06F 11/1471; G06F 2009/45591; G06F 2201/815
USPC .................................................. 711/162, 161
See application file for complete search history.

(56) References Cited

U.S. PATENT DOCUMENTS

| | | | |
|---|---|---|---|
| 9,619,255 B1* | 4/2017 | Natanzon | G06F 9/45558 |
| 2014/0149695 A1* | 5/2014 | Zaslavsky | G06F 9/455 |
| | | | 711/162 |
| 2014/0379663 A1* | 12/2014 | Koza | G06F 16/128 |
| | | | 707/682 |
| 2016/0283329 A1* | 9/2016 | Natanzon | G06F 11/1464 |

* cited by examiner

*Primary Examiner* — Hosain T Alam
*Assistant Examiner* — Zubair Ahmed
(74) *Attorney, Agent, or Firm* — Workman Nydegger

(57) ABSTRACT

One example method includes receiving, at an IO journal, a new entry that identifies a respective disk location L, and data X written at that disk location L, and determining whether a location specified in an oldest entry of the IO journal is specified in any other entries in the IO journal. When the location specified in the oldest entry is not specified in any other entries in the IO journal, adding the new entry to the IO journal, and augmenting the new entry with undo data. Or, when the location specified in the oldest entry is specified in at least one other entry in the journal, setting data specified in the oldest entry as undo data for the next entry that identifies that location, and adding the new entry to the IO journal, and deleting the oldest entry from the IO journal.

20 Claims, 6 Drawing Sheets

Limited Length IO Journal with LIMIT=3 at time T2

State 1: 600a

| Time | T0 | T1 | T2 |
|---|---|---|---|
| IO | L2=A<br>Undo=G | L2=X | |

New IO entry with L3=Q. Journal becomes:

State 2: 600b

| Time | T0 | T1 | T2 |
|---|---|---|---|
| IO | L2=A<br>Undo=G | L2=X | L3=Q<br>Undo=B |

New IO entry arrives with L1=W. Journal becomes:

State 3: 600c

| Time | T1 | T2 | T3 |
|---|---|---|---|
| IO | L2=X<br>Undo=A | L3=Q<br>Undo=B | L1=W<br>Undo=R |

Note that undo data is preserved by using the entry that was removed, without need to re-read the undo data from volume.

New IO entry arrives with L4=Y. Journal becomes:

State 4: 600d

| Time | T2 | T3 | T4 |
|---|---|---|---|
| IO | L3=Q<br>Undo=B | L1=W<br>Undo=R | L4=Y<br>Undo=U |

FIG. 3

SYSTEM AND A METHOD FOR GENERATING LIVE VM IMAGES WITH AN EXTENDED RECOVERY RANGE

FIELD OF THE INVENTION

Embodiments of the present invention generally relate to data restore and recovery processes. More particularly, at least some embodiments of the invention relate to systems, hardware, software, computer-readable media, and methods for implementing and using an IO journal that enables spin up of a VM at points in time prior to, and/or subsequent to, a VM image backup time.

BACKGROUND

Current approaches to VM recovery do not enable a user to spin up a VM to a point in time in its near past, that is, at a time preceding a time when a backup was taken of the VM image. However, the ability to spin up a VM to a point time prior to the VM image backup time might be useful, for example, in cases where the backup image was taken at a particular time due to the occurrence an event such as, for example, an upgrade to the VM, or a security breach. In cases such as these, it may be useful to be able to recover the VM image to a point in the near past or future of the backup image time.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

FIG. 3 discloses aspects of an example IO journal.

DETAILED DESCRIPTION OF SOME EXAMPLE EMBODIMENTS

Figure 1:
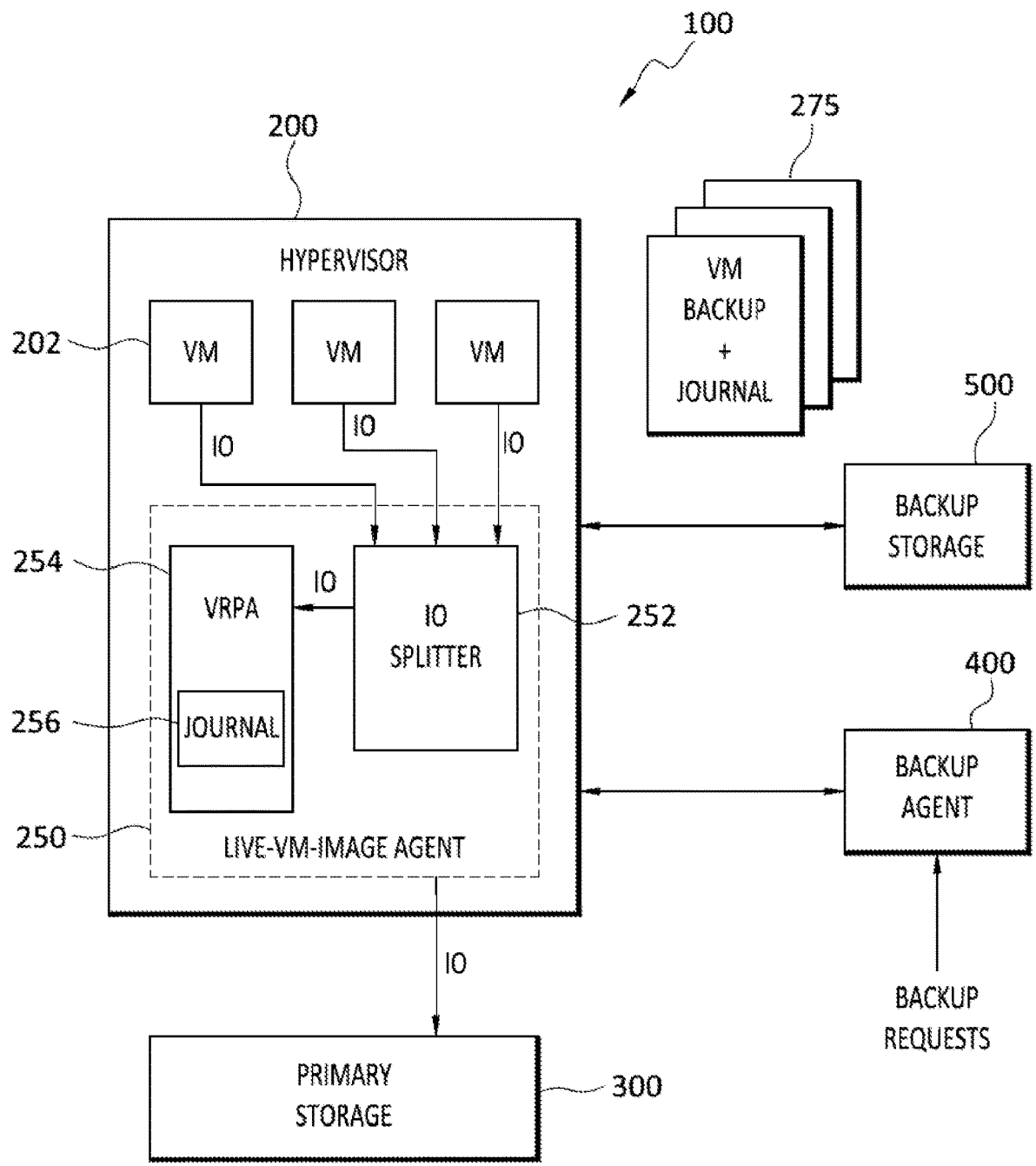
FIG. 1 discloses aspects of an example operating environment.

Embodiments of the present invention generally relate to data restore and recovery processes. More particularly, at least some embodiments of the invention relate to systems, hardware, software, computer-readable media, and methods for implementing and using an IO journal that enables spin up of a VM at points in time prior to, and/or subsequent to, a VM image backup time.

In general, example embodiments of the invention may involve the definition and use of an IO journal that may enable spin up of a VM to a point in time prior to when an image of the VM, such as the most recent image for example, was backed up. Some particular embodiments are directed to methods for generating a Live VM that includes an image level VM backup and an journal with a predefined recovery range [t−q,t+p] for some 'q,' 'p'>0 where 't' is the backup image time. The values of 'p' and 'q' may be the same as each other, or different from each other. Such embodiments may, for example, allow the spin up of a VM at one or more times before, and/or after, the backup image time. This approach to VM restore and recovery may result in better quality recovery images.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in anyway. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that such embodiments may result in better quality recovery images by enabling spin up of a VM to restore points that precede and/or follow, possibly by less than 1 second for example, the time when a backup image was taken of that VM. Embodiments of the invention may enable creation of a Live VM without requiring integration with the backup system that created the VM image. Embodiments of the invention may generate and/or obtain enough information to ensure the ability to spin up a VM to a restore point prior in time to, and/or subsequent to, a time when a backup image of the VM was taken.

A. Aspects of an Example Architecture and Environment

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of operations including, but not limited to, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing and other services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data.

Devices in the operating environment may take the form of software, physical machines, or virtual machines (VM), or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take the form of a .VMX file and one or more .VMDK files (VM hard disks) for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

With particular attention now to FIG. 1, one example of an operating environment for embodiments of the invention is denoted generally at 100. In general, the operating environment 100 can take any form that will enable performance of the disclosed processes and operations. As such, the operating environment 100 is presented only by way of example, and is not intended to limit the scope of the invention. Moreover, the functional allocation disclosed in connection with the operating environment 100 is likewise presented only by way of example and, in other embodiments, the disclosed functions can be allocated amongst the disclosed entities in any other way that will still enable performance of those functions.

The example operating environment 100 may include, for example, a hypervisor 200 that communicates with primary storage 300, a backup agent 400 that may comprise software operable to create VM backups according to one or more predefined policies, and backup storage 500, which can be implemented in the form of a Dell-EMC DataDomain environment for example, which stores VM backups and their associated journals, as discussed below. While not specifically indicated in FIG. 1, the backup storage 500, backup agent 400, and primary storage 300, may all communicate with each other as well. In some embodiments, the backup agent 400 and associated backup system may be combined together with the hypervisor 200, but that is not required.

In general, the hypervisor 200 hosts, or otherwise includes, any number of VMs 202 that are desired to be protected, that is, backed up. The hypervisor 200 may be, for example, a VMWare ESXi hypervisor, but that is not required and other hypervisors may be used. One, some, or all, of the VMs 202 may host or otherwise include one or more applications that issue IOs, such as read, write, and delete, operations for example, directly and/or indirectly to the primary storage 300. The applications running on the VMs 202 can be any type of application that generates new and/or modified data, including, but not limited to, SQL, Oracle, Exchange, email applications, media applications, word processing applications, database applications, engineering applications, and financial applications, for example.

In addition to the VMs 202, the hypervisor 200 also includes a live-vm-image agent 250. In general, the live-vm-image agent 250 operates to augment each backup created by backup agent 400 by adding an I/O journal to the backup. One example embodiment of a live-vm-image agent 250 takes the form of a RecoverPoint (RP) system that may include an IO splitter 252 that runs on the hypervisor 200 and intercepts IOs issued by applications hosted by the VMs 202, as shown in FIG. 1. The live-vm-image agent 250 may also include a virtual RecoverPoint appliance (vRPA) 254 which is a virtual machine that handles the replication and data protection tasks, receives tracked IOs from the IO splitter 252, and records those IOs in a journal 256. The journal 256 may, or may not, be persistently stored in memory or storage. More generally, element 254 may comprise, or consist of, any Data Protection Appliance (DPA), and is not limited to implementation as a vRPA.

As further indicated in FIG. 1, one or more live-vm-images 275 may be created, by the live-vm-agent 250 in cooperation with the backup agent 400, that are then stored in the backup storage 500 for later retrieval and restoration to one or more targets which may, or may not, be one of the VMs 202. In general, each live-vm-image 275 includes a backup of a VM 202 as well as a journal of IOs relating to that VM. By using the backup and the journal, a VM corresponding to a particular point in time can be spun off from the corresponding live-vm-image 275 and then restored to one or more targets.

B. Aspects of an Example Live-Vm-Image

Figure 2:
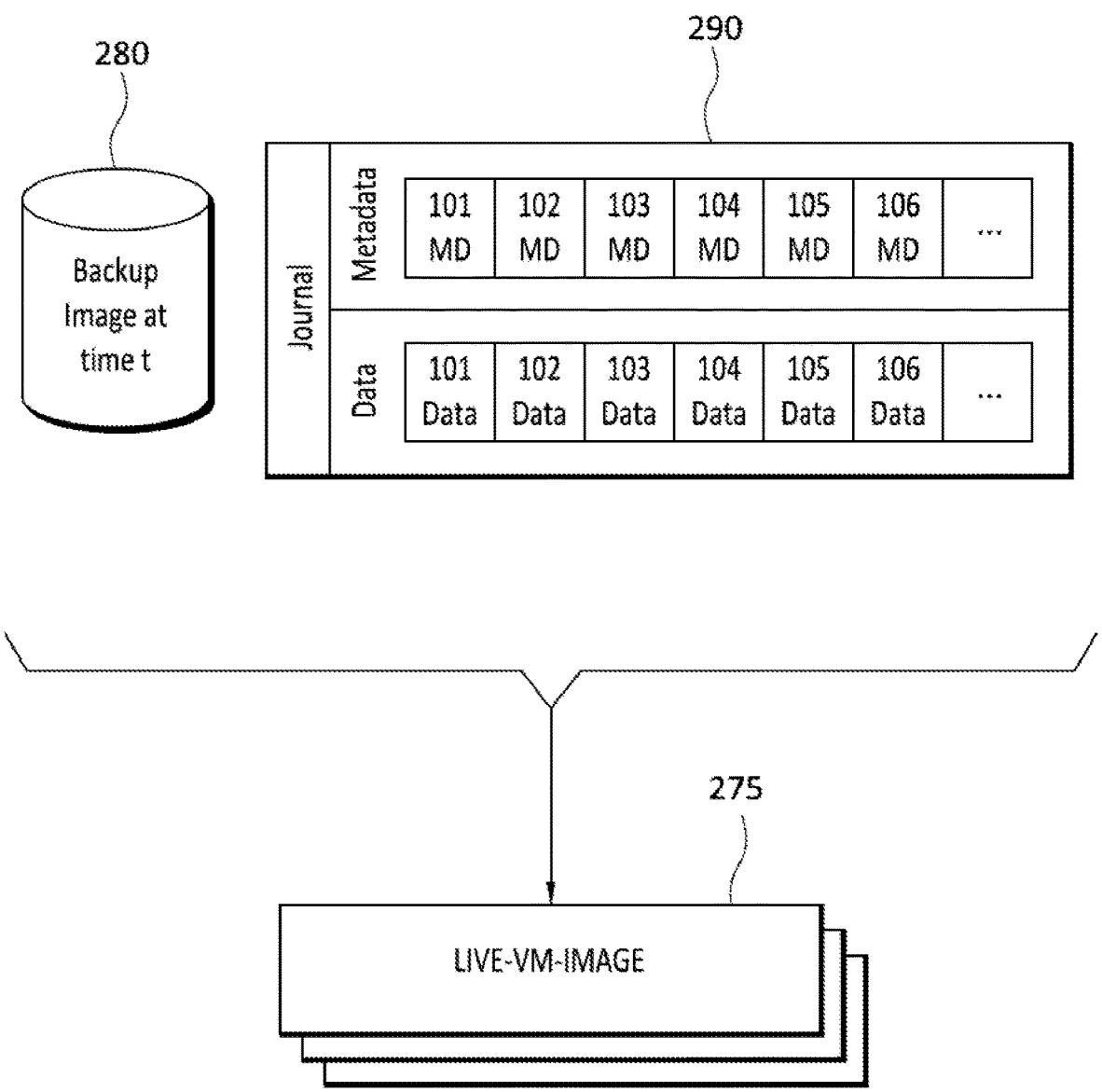
FIG. 2 discloses aspects of an example IO journal.

With continued reference to FIG. 1, and referring now to FIG. 2 as well, further details are provided concerning some example live-vm-images, such as the live-vm-images 275 referred to in FIG. 1. As indicated in FIG. 2, a live-vm-image 275 for example may comprise two components, namely, a VM image level backup 280 and an IO journal, or simply, a journal, 290. For reference purposes, the image level backup 280 is shown in FIG. 2 as having been created at time 't' by, or at the direction of, an entity such as the backup agent 400 disclosed in FIG. 4. The image level backup 280 may be a crash-consistent backup.

As further shown in the illustrated example, the journal 290 may include both data and corresponding metadata for any number of IOs. In this particular example, six IOs are indicated, although any number of IOs can be captured in a journal 290. The particular number of IOs to be captured in the journal 290 may be specified, such as by providing "record the first six IOs after time t," and/or the number of IOs to be captured in the journal 290 may be specified based the passage of a particular period of time, for example, that "record all IOs for the time period from t to t+5 seconds." As disclosed elsewhere herein, the combination of the VM image level backup 280 and the journal 290 entries enables the spinoff of a VM that is application-consistent as of a particular point in time (PIT).

In view of the foregoing discussion, the journal 290 may be thought of as a stream, or streams, of data and metadata. For example, the journal 290 may comprise a stream of data, and a stream of corresponding metadata, and the two streams are kept in the journal 290 in association with each other and the corresponding IO. Thus, when the IOs in the journal 290 are applied to a full image VM backup, the metadata and data corresponding to each IO can be readily read out from the journal 290. In some embodiments, the journal 290 may comprise a single stream that includes both the data and associated metadata.

C. Aspects of an Example Limited Length IO Journal

As noted earlier herein, embodiments of the invention may enable a user, such as through the use of a limited length IO journal, to spin up a VM to restore points that precede and/or follow, possibly by less than 1 second for example, the time when a backup image was taken of that VM. More particularly, if the IO journal start time is some t−q, q>0 where t is the backup image creation time, then a user may recover a VM at any point in the range defined as [t−q,t]. In order to know when to start to collect IOs for the IO journal however, a determination must be made as to when the time t−q has arrived so that IO collection can begin for the IO journal.

One approach to this determination might be to rely on a notification from the backup system. That is, if the backup system were to notify, at time t−q, that the creation of a new backup image will take place at time t, then collection of IOs can begin for the journal, with assurance that one or more IOs would be collected prior to the creation of the backup image. In some circumstances at least, integration with the backup system may not be possible, or desired, and an alternative approach may be better suited to the circumstances.

One such alternative approach may involve the creation and use of a 'Limited Length IO Journal,' which may be referred to herein as an LL IO journal. The LL IO journal has a limited length property which assures that the length of the LL IO journal will not exceed a certain, defined, limit. In general, the length of the LL IO journal may be maintained within the limit by removing older entries from the LL IO journal as new ones come in, while also intelligently managing undo data so there is no need to re-read the undo data. Because the length of the LL journal may be fixed, the particular time range, T1 to T4 or T2 to T5 for example, spanned by the LL IO journal may change as new IOs come in and older IOs are deleted. Thus, embodiments of the LL IO journal may be referred to as comprising a 'sliding window' configuration.

With attention now to FIG. 3, details are provided concerning an example Live VM, and an example LL IO journal 600. As will be apparent, the example LL IO journal 600 may differ in one or more regards from other IO journals.

One example of an algorithm for adding an entry to the LL IO journal 600 may take the following form (information concerning how the Undo data may be obtained is included in one or more of the Related Applications):

On Receiving a New Entry (Location, Data)

```
If IO Journal length == LIMIT:
    If oldest IO Journal entry location appears at least one more time:
        Set the data of the oldest entry to be the undo of the next location entry.
    Delete oldest entry.
If new entry location does not appear in the IO Journal
    Augment new entry with its "undo" data.
Add new entry to the IO Journal.
```

In FIG. 3, the example LL IO journal 600 is illustrated as a table that indicates a respective time at which each of the IOs is written. The LL IO journal 600 is limited to a total of 3 entries, although other LL IO journals may have any number of entries, greater or less than 3, and four different sequential states of the LL IO journal 600 are indicated, namely, state1 600a, state2 600b, state3 600c, and state4 600d. Note that the times 'T' referred to in the discussion of FIG. 3 refer to the respective times when a corresponding IO was written, such as to a disk, storage, memory, or volume, for example.

In state1 600a, it can be seen that at time T0, an IO has been recorded in the journal that includes the data 'A' at location L2 (e.g., on a disk) and also includes Undo data 'G.' An IO written at time T1 is recorded that includes data X at location L2, and at time T2, the end of the LL IO journal 600, no IO has been recorded.

Next, and with reference to state2 600b, suppose that a new IO written at time T2 arrives at the LL IO journal 600 with data 'Q' at location L3 and Undo data 'B.' Because the LL IO journal 600 is constrained to a particular length, the addition of the new IO that was written at time T2 means that the earliest entry in the LL IO journal 600, namely, the entry at time T0, must be deleted from the LL IO journal 600. The addition of the entry for the IO written at time T2, and removal of the entry for the IO that was written, or already present, at time T0, are reflected in state3 600c of the LL IO journal 600. Thus, while the time range, or window of time, spanned by the LL IO journal 600 at state2 600b extended from time T0-T2, the window of time spanned by the LL journal 600 at state3 600c now extends from time T1-T3.

As well, and with continued reference to state2 600b and state3 600c, it can be seen that at time T1, the data 'A' of location L2 was overwritten with the data 'X.' Thus, and as shown for the T1 entries in those states, 'A' becomes the Undo data associated with the data 'X.' More generally, Undo data is provided for the first time that a given location 'L' appears in the particular time range spanned by the LL IO journal 600. Thus, in state2 600b for example, Undo data 'G' is provided with the IO that wrote data 'A' to L2 at time T0, but subsequent writes to L2, such as when 'X' is written to L2 at time T1, do not include, or need, Undo data, since the prior value of the data at L2, that is, 'A,' is known from the IO at time T0. In this way, and as indicated in state3 600c, the Undo data 'A' may be obtained and preserved using the removed time T0 entry, as shown in state2 600b. Thus, there is no need to re-read the Undo data 'A' from the volume.

With continued reference to FIG. 3, a new IO that writes the date 'W' at location L1 at time T3 is recorded at the LL IO journal 600. Because this is the first entry for location L1 in state3 600c of the LL IO journal 600, the Undo data 'R' is also recorded in the LL IO journal 600 with this new IO. This is shown at state3 600c. In contrast with state2 600b of the LL IO journal 600, which spanned the time range from T0-T2, the time ranged spanned by state3 600c of the LL IO journal 600 now extends from T1-T3. Thus, while the additional IO that took place at T3 has been recorded in the LL IO journal 600, the time range spanned by the LL IO journal 600 has not changed as a result of the recording of that IO because the IO written at T0 has been deleted from the LL IO journal 600.

Turning next to state4 600d, and with continued reference to state3 600c, an IO is recorded that wrote data 'Y' to location L4 at time T4. Because this is the first entry for location L4 in state4 600d of the LL IO journal 600, the Undo data 'U' is also recorded in the LL IO journal 600 with this new IO. In correspondence with the recording of the IO written at T4, the LL IO journal 600 entry for the IO written at time T1 is deleted and, accordingly, the time range spanned the LL IO journal 600 in state 4 600d now extends from T2-T4, although the overall length of the LL IO journal 600 has not changed.

With continued reference to the example of state4 600d, the LL IO journal entries may be used to spin up a VM to one of the time points embraced within that LL IO journal 600. For example, suppose that time T4 corresponds to 't' when a backup image was taken, and time T2 is the time point to which the VM is to be restored. At time T4 when the VM backup image is taken, L3=Q, L1=W, and L4=Y. Moving back in time to T3, L3=Q, L1=W, and L4=U. Note that here, the Undo data 'U' has been applied to L4 since, at time T3, the data Y had not been written to L4. Moving back now in time to T2, the desired restore point, L3=Q, L1=R, and L4=U. Note that the Undo data 'U' has been applied to L1 since, at time T2, the data W had not been written to L1. As a result of the applications of the Undo data, and taking into account the other unchanged data values, the VM is now at the desired restore point T2 at which L3=Q, L1=R, and L4=U.

As indicated in the discussion of FIG. 3, the LL IO journal 600 may be continuously maintained by recording new IO entries, and deleting old IO entries. Because the LL IO journal 600 may be continuously maintained, it is not necessary that it be known, in advance, when a backup image of a VM will be taken. That is, so long as the LL IO journal 600 is (i) long enough and (ii) continuously maintained, there may always be at least one IO entry in the LL IO journal 600 that pre-dates the time 't' when the backup is taken. Further, once the time 't' is known, the LL IO journal 600 may continue to record IO entries for a time t+p. Thus, the LL IO journal 600 may contain one or more entries prior to time 't' and one or more entries subsequent to time 't.' In this way, the backup image taken at 't' may be rolled back in time to a point prior to 't' or forward in time to a point subsequent to 't.'

Note that as used herein, an LL IO journal that is continuously maintained refers to an LL IO journal whose start time for recording IOs is not necessarily tied to any particular event. Thus, one example of a continuously maintained LL IO journal may begin recording IOs at an arbitrary time, and without regard to whether, or when, a backup image of one or more VMs is taken, or expected to be taken.

More particularly, to create a Live VM, the LL IO journal may be continuously maintained with a Limited Length LIMIT=t−q. When a new backup is created at time 't,' the LL IO journal continues collect IO entries up until time t+p, where p>0. At that point, a Live VM may be created that includes the IO journal and the backup image. This will allow a user to spin up a VM within the requested range [t−q,t+p].

In one variation of this approach, the LL IO journal may not be continuously maintained. Instead, IO collection and entry in the LL IO journal may be delayed until such time as a backup is expected to be taken. Then, IO collection may begin prior to the expected backup time and extend until some time after the point in time when the backup is taken. The expected start time may be estimated based on, for example, models, a backup schedule, historical information, an event in the computing system, and/or other inputs.

D. Example Aspects of Live VM Creation

Among other things, embodiments of the invention may enable a VM to be spun up that corresponds to a restore point prior in time to when a backup image of that VM was taken. In general, the VM may be synched with the LL IO journal. Particularly, let 'r' be the point in time in the interval [t−q,t+p] that corresponds to the restore point to which the VM is to be spun up, and 't' the time that the backup image of the VM was taken. If r>t, then all the IOs of the LL IO journal may be applied to the VM up until the LL IO journal entry with timestamp 'r.' On the other hand, if r<t, the following algorithm may be employed to spin up the VM to the desired restore point using one or more LL IO journal entries with IOs that precede time 't':

```
FOR EACH Entry E in the RANGE[t, r]: //going backwards from t to r
  IF E contains Undo:
    Apply Undo data.
  ELSE
    Find next Entry N with same location as E //going backwards
      Apply the Data of N.
```

E. Example Methods

Figure 4:
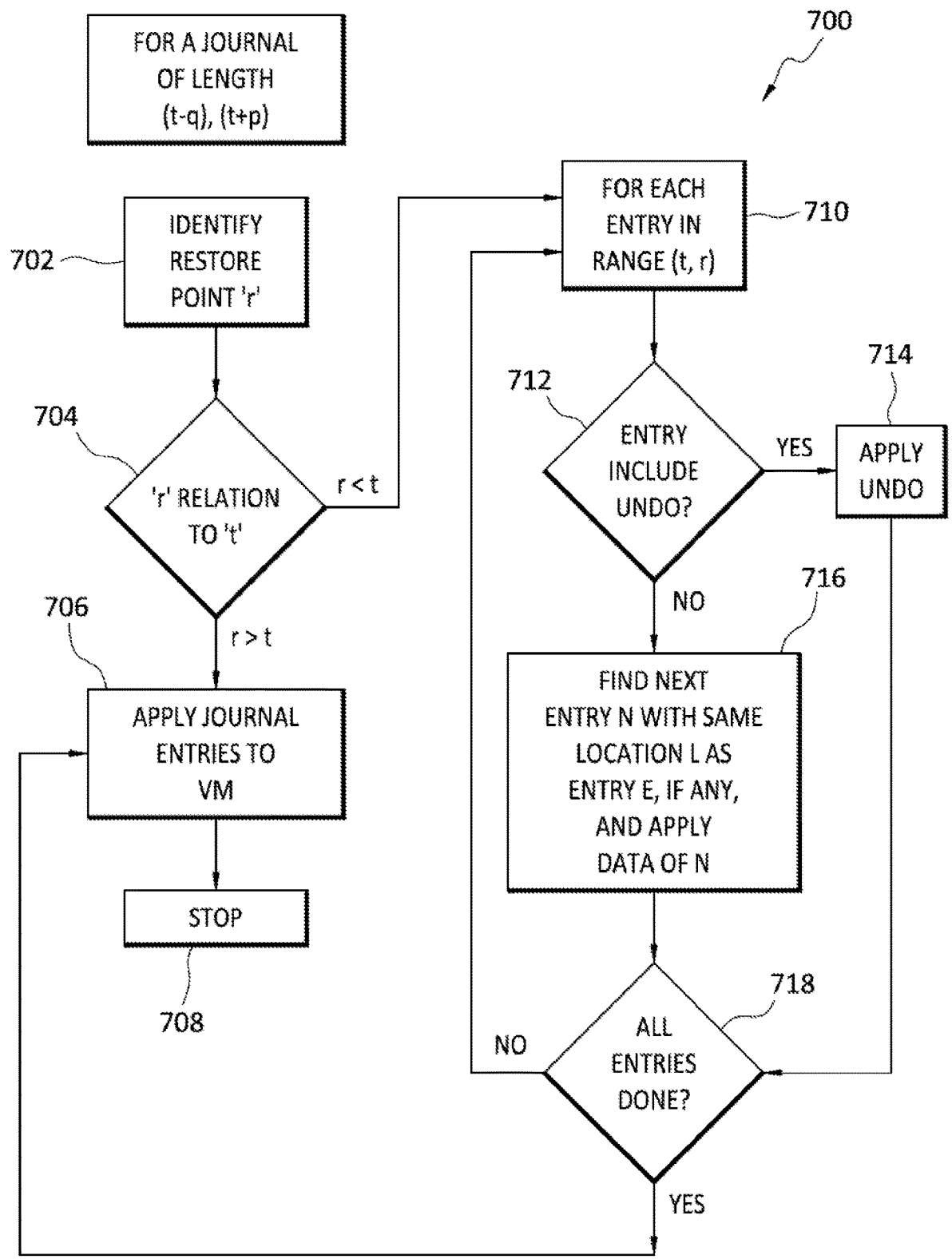
FIG. 4 discloses aspects of an example method for apply IO journal entries to a backup image.

With reference now to FIG. 4, details are provided concerning some methods for spinning up a live VM to past/future points in time, relative to a time that a backup image of the VM was taken. One example of such a method is denoted at 700. In some embodiments, the method 700 may be performed in whole or in part by, and at, a cloud computing system. However, the example method need not be performed by any particular entity, or entities, or within any particular computing environment, and the foregoing is provided only by way of example.

The example method 700 may be performed in connection with an LL IO journal spanning the range of time [t−q, t+p], where 't' is the time that a backup image of a VM was taken, 't−q' is a period of time of length 'q' preceding 't,' and 't+p' is a period of time of length 'p' following 't.' No particular values need be assigned to any of these variables.

The method 700 may begin when a restore point 'r' is identified 702 that falls within the range of time spanned by the LL IO journal. The restore point 'r' may be selected based on any criteria. By way of illustration, the restore point 'r' may be selected to pre-date a problem or other event known to have occurred in a computing system, that is, the restore point 'r' falls within the time range t−q. Thus, spinning up a VM at the restore point 'r,' prior to when the problem occurred, assurance may be had that the spun up VM was not impacted by the problem. In other circumstances, the restore point 'r' may follow the backup time 't,' that is, the restore point 'r' falls within the time range t+p.

Next, the relation of 'r' to 't' is determined 704. If r>t, that is, the desired restore point to which the VM will be spun up is later in time than the time 't' that the VM backup image was taken, the LL IO journal entries may be applied 706 in chronological order, beginning with the entry immediately following 't', up to, and including, the entry with timestamp 'r.' At this point, the VM has been spun up to time 'r' and the method 700 may stop 708. In some instances, the spun up VM may be combined with the LL IO journal to create a Live VM image.

As noted earlier, a determination 704 is made as to the relation between 'r' and 't.' If, in contrast with the circumstance just discussed where r>t, it is determined instead at 704 that r<t, then the method 700 may advance to 710 where each entry E in the LL IO journal for the range [t,r] is considered. Because each entry E corresponds to a respective time of a particular IO, the entries E may be considered 710 in reverse chronological order, beginning with the entry that immediately precedes time 't' and proceeding to, and including, the entry with timestamp 'r.'

In more detail, when r<t, each entry E may be reviewed to determine 712 whether or not the entry E includes Undo data. If an entry E is determined 712 to include Undo data, the Undo data may be applied 714 so that the data in the location L associated with that entry is reverted back to the Undo data.

On the other hand, if it is determined 712 that no Undo data is present for an entry E, such that no change is required to the data at the location L corresponding to that entry E, the next entry with the same location L as that for entry E may be checked 716. Particularly, if entry E does not include Undo data, then it can be concluded that the location L specified in entry E appears in at least one other entry in the LL IO journal, although it may not necessarily be known yet whether or not that additional appearance of location L is specified in an entry that follows, or precedes, time r. Thus, the method 700 continues in reverse chronological order to the next entry N with the same location L as entry E. The data of N is then applied. If the entry N is the first entry in the LL IO journal for that location L, and the time r<time of N, the entry N will include Undo data, which may then be applied. In general, the loop that begins at 710 may continue, for each entry in the range (t,r), until either N with time t(N)≤r is found and its data is applied 716, or until N contains Undo data and that Undo data is applied 714.

Note that some entries of the LL IO journal may contain Undo data, while others may not. Depending upon the length of the LL IO journal, it may be possible that none of the entries include Undo data. On the other hand, in some embodiments, it may be the case that all the entries in the LL IO journal include Undo data.

As well, it is noted that when applying LL IO journal entries to a VM image, it is possible, though it may not be necessary, to apply all LL IO journal entries that include the same location L to the VM image. Rather, it may only be necessary to apply the oldest LL IO journal entry (with location L) to the VM image, in the case when r t, or it may only be necessary to apply the newest LL IO journal entry (with location L) to the VM image, where the newest LL IO journal entry has a timestamp≤r.

Each time an entry E is checked at 712 or 716, a further check 718 may be performed to determine if all the entries E in the range 't−q' have been checked, and updated if needed. If not, the method may return to 710. Otherwise, the method 700 may pass to 706 where the LL IO journal entries are applied to the VM. At this point, the LL IO journal entries have been traversed for the range 't−q,' changes applied where needed, and the VM has been spun up to time 'r.' Thus, a Live VM image is created by applying the LL IO journal entries to the backup image of the VM.

Figure 5:
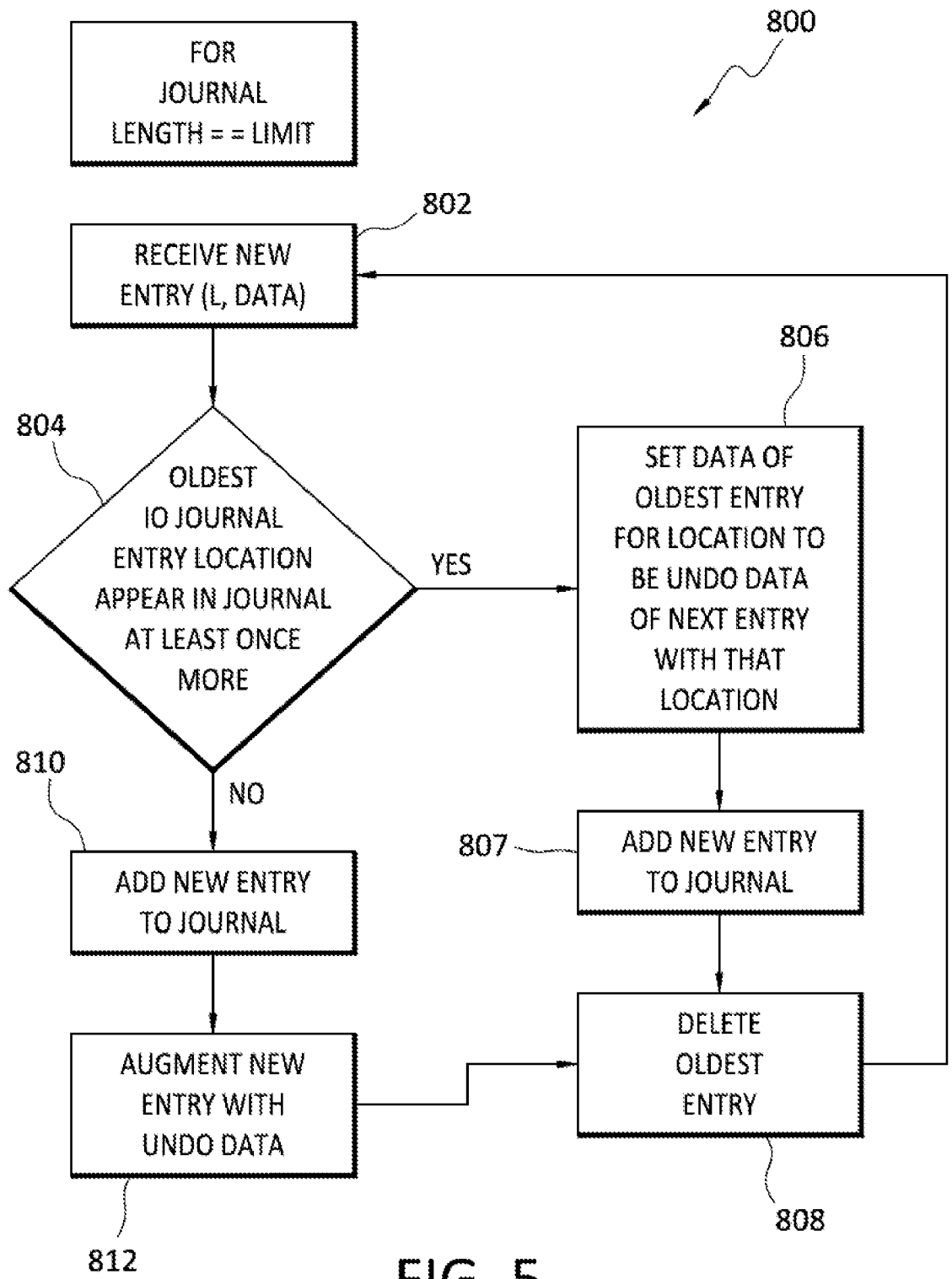
FIG. 5 discloses aspects of an example method for creating and maintaining an IO journal.

Turning next to FIG. 5, details are provided concerning some methods for generating an LL IO journal, such as may be used in connection with the method 700, for example. One example of such a method is denoted at 800. In some embodiments, the method 800 may be performed in whole or in part by, and at, a cloud computing system. However, the example method need not be performed by any particular entity, or entities, or within any particular computing environment, and the foregoing is provided only by way of example.

In the method 800, it is assumed that the LL IO journal length has reached its predefined limit. Depending upon the length of the LL IO journal, which might have only a few entries, or possibly hundreds, or thousands, it may take some time for the LL IO journal to be filled with entries. In general, the first time that an entry for location L is entered in the LL IO journal, Undo data may be included with that entry. As disclosed elsewhere herein, subsequent entries in the LL IO journal for the same location L may not include Undo data.

The example method 800 may begin when a new entry (L, data) is received 802 at an LL IO journal whose length is at its limit. The new entry may correspond to an IO that wrote data to location 'L' at a particular time within the range spanned by the LL IO journal. For example, the new entry might be L2, X.

Next, a check 804 may performed concerning the oldest entry in the LL IO journal. Particularly, the check 804 may involve determining if the location specified in the oldest entry appears at least one more time in the LL IO journal. If so, the data from the oldest entry is set as the Undo data 806 of the next LL IO journal entry that concerns the same location L as the location specified in the oldest entry. The new entry is then added 807 to the LL IO journal, and the oldest entry may then be deleted 808.

On the other hand, if the check 804 reveals that the location specified in the oldest entry does not appear again in the LL IO journal, then there is no need to set the data of the oldest entry as Undo data. Thus, in this case, the new entry may be added to the journal 810, and the new entry augmented 812 with Undo data. The oldest entry may then be deleted 808.

Regardless of the scenario at 804, the new entry is added 807/810, and the oldest entry is deleted 808. In this way, the overall length of the LL IO journal is maintained at the predefined length limit.

It is noted with respect to the disclosed processes, including the creation and modification of example embodiments of the LL IO journal, and the spin up of a VM at a particular restore point 'r,' as exemplified in the methods 700 and 800, the incoming IOs may be numerous and/or may arrive as part of a high speed stream which may involve, for example, hundreds, or thousands, of IOs per second. As such, the receipt and handling of incoming IOs, and the management of the LL IO journal including the recording and deleting of entries, and the other processes involved or implicated by methods 700 and 800, would be well beyond the ability of a human to perform practically, or at all, in his mind.

It is further noted that methods 700 and 800 may be combined. For example, an IO journal created by the example method 800 may be used in the example method 700 to create a Live VM. Part, or all, of the methods 700 and 800 may be combined in any other way as well, and the foregoing is presented only by way of example.

F. Further Example Embodiments

Following are some further example embodiments of the invention. These are presented only by way of example and are not intended to limit the scope of the invention in any way.

Embodiment 1. A method, comprising: receiving, at an IO journal, a new entry that identifies a respective disk location L, and data X written at that disk location L; determining whether a location specified in an oldest entry of the IO journal is specified in any other entries in the IO journal, and then: when the location specified in the oldest entry is not specified in any other entries in the IO journal, adding the new entry to the IO journal, and augmenting the new entry with undo data; or when the location specified in the oldest entry is specified in at least one other entry in the IO journal, setting data specified in the oldest entry as undo data for the next entry that identifies that location, and adding the new entry to the IO journal; and deleting the oldest entry from the IO journal.

Embodiment 2. The method as recited in embodiment 1, wherein the IO journal has a fixed length.

Embodiment 3. The method as recited in any of embodiments 1-2, wherein each entry in the IO journal corresponds to an IO that was written to a VM.

Embodiment 4. The method as recited in in any of embodiments 1-3, wherein the journal is continuously maintained for a stream of IOs.

Embodiment 5. The method as recited in in any of embodiments 1-4, wherein each entry in the journal specifies a location, and data written at that location as a result of an IO with which the entry is associated.

Embodiment 6. The method as recited in in any of embodiments 1-5, wherein the journal includes an entry with a timestamp prior to a time t when a backup image was taken of a VM with which the IO journal is associated.

Embodiment 7. The method as recited in embodiment 6, wherein the time t is unknown when the entry with the timestamp prior to time t is received.

Embodiment 8. The method as recited in in any of embodiments 1-7, wherein the undo data is associated with the next entry, in chronological order, that identifies the same location as the oldest entry.

Embodiment 9. The method as recited in in any of embodiments 1-8, wherein a length of the IO journal remains constant, but a particular range of time spanned by the IO journal changes each time a new entry is added and the oldest entry is deleted.

Embodiment 10. The method as recited in in any of embodiments 1-9, wherein the journal is associated with a VM, and the method further comprises taking a backup image of the VM during a time range spanned by the IO journal.

Embodiment 11. A method comprising: creating an IO journal of length [t−q, t+p], where t is a time at which a backup image of a VM was taken, t−q refers to a period of time beginning at t and extending from t back to time q, and t-p refers to a period of time beginning at t and extending from forward to time p; identifying a restore point r that is a point in time that falls within the length of the IO journal; and determining whether r>t or r<t and then: when r>t, and for each different location L appearing in the IO journal, applying to the backup VM image the newest IO journal entry with location L and timestamp on or before r; or when r<t, for each different location L appearing in the IO journal over a range (t,r), applying to the backup VM image, the oldest IO journal entry with a timestamp r, and applying the oldest IO journal entry comprises either applying the data of the oldest IO journal entry or applying undo data of the oldest IO journal entry.

Embodiment 12. The method as recited in embodiment 11, wherein the IO journal entries in the range (t, r) are checked for undo data in reverse chronological order of the IO journal entries.

Embodiment 13. The method as recited in in any of embodiments 11-12, wherein when r<t, an IO journal entry that does not include undo data is not modified.

Embodiment 14. The method as recited in any of embodiments 11-13, wherein application of undo data to an IO journal entry replaces data in that IO journal entry with data that was written by an IO at a time prior to when an IO associated with that IO journal entry was written.

Embodiment 15. The method as recited in any of embodiments 11-14, wherein the restore point r is selected based on the occurrence of an event.

Embodiment 16. The method as recited in any of embodiments 11-15, wherein creating the IO journal comprises: collecting one or more IOs prior to time t; and, collecting one or more IOs subsequent to time t.

Embodiment 17. The method as recited in embodiment 16, wherein time t is unknown when the IO journal is created.

Embodiment 18. The method as recited in any of embodiments 11-17, wherein each entry in the IO journal corresponds to a particular IO that was written at a particular time, and each entry in the IO journal comprises information that identifies a respective disk location L, and data X written at that disk location L.

Embodiment 19. The method as recited in any of embodiments 11-18, wherein a live VM image is created by applying the IO journal entries to the backup VM image.

Embodiment 20. The method as recited in any of embodiments 11-19, wherein for multiple IO journal entries that refer to the same location, only the oldest of those IO journal entries has associated undo data.

Embodiment 21. A method for performing any of the operations, methods, or processes, or any portion of any of these, disclosed herein.

Embodiment 22. A non-transitory storage medium having stored therein instructions that are executable by one or more hardware processors to perform the operations of any one or more of embodiments 1 through 21.

G. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 6:
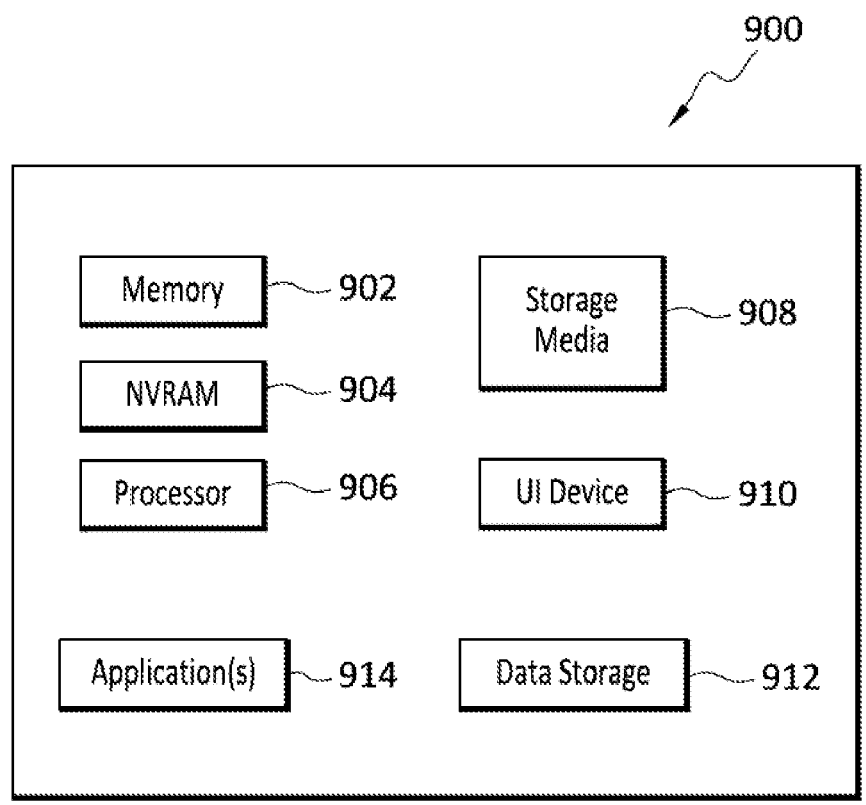
FIG. 6 discloses aspects of an example computing entity.

With reference briefly now to FIG. 6, any one or more of the entities disclosed, or implied, by FIGS. 1-5 and/or elsewhere herein, may take the form of, or include, or be implemented on, or hosted by, a physical computing device, one example of which is denoted at 900. As well, where any of the aforementioned elements comprise or consist of a virtual machine (VM), that VM may constitute a virtualization of any combination of the physical components disclosed in FIG. 6.

In the example of FIG. 6, the physical computing device 900 includes a memory 902 which may include one, some, or all, of random access memory (RAM), non-volatile random access memory (NVRAM) 904, read-only memory (ROM), and persistent memory, one or more hardware processors 906, non-transitory storage media 908, UI device 910, and data storage 912. One or more of the memory components 902 of the physical computing device 900 may take the form of solid state device (SSD) storage. As well, one or more applications 914 may be provided that comprise instructions executable by one or more hardware processors 906 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud storage site, client, datacenter, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
identifying a restore point 'r' that falls within a range of time spanned by a limited length (LL) IO journal;
determining a relation of the restore point 'r' to a backup time 't' of a VM backup image;
when the restore point 'r' is later in time than the backup time 't,' spinning up a VM by applying entries in the LL IO journal to the VM backup image in chronological order; and
when the restore point 'r' is earlier in time than the backup time 't,' reviewing each entry in the LL IO journal to determine whether or not the entry includes Undo data and when the entry includes Undo data, applying the Undo data to the VM backup image, and when the entry does not include Undo data, checking a next entry until all the entries in the LL IO journal have been checked, and then applying the entries in the LL IO journal to the VM backup image.

2. The method as recited in claim 1, wherein the LL IO journal spans a range of time [t−q, t+p], where 't−q' is a period of time of length 'q' preceding 't,' and 't+p' is a period of time of length 'p' following 't'.

3. The method as recited in claim 2, wherein the restore point 'r' falls within a period of time t−q.

4. The method as recited in claim 2, wherein the restore point 'r' falls within a period of time t+p.

5. The method as recited in claim 1, wherein the restore point 'r' is selected to pre-date a problem or other event known to have occurred in a computing system.

6. The method as recited in claim 1, wherein the VM is spun up at the restore point 'r'.

7. The method as recited in claim 1, wherein when the restore point 'r' is later in time than the backup time 't,' the entries in the LL IO journal are applied to the VM backup image in chronological order, beginning with the entry immediately following 't', up to, and including, the entry with timestamp 'r'.

8. The method as recited in claim 1, wherein after the entries in the LL IO journal have been applied to the VM backup image, the VM has been spun up to time 'r'.

9. The method as recited in claim 1, wherein the spun up VM is combined with the LL IO journal to create a Live VM image.

10. The method as recited in claim 1, wherein the Live VM image is created by applying the LL IO journal entries to the backup image of the VM.

11. A non-transitory storage medium having stored therein instructions that are executable by one or more hardware processors to perform operations comprising:
identifying a restore point 'r' that falls within a range of time spanned by a limited length (LL) IO journal;
determining a relation of the restore point 'r' to a backup time 't' of a VM backup image;
when the restore point 'r' is later in time than the backup time 't,' spinning up a VM by applying entries in the LL IO journal to the VM backup image in chronological order; and
when the restore point 'r' is earlier in time than the backup time 't,' reviewing each entry in the LL IO journal to determine whether or not the entry includes Undo data and when the entry includes Undo data, applying the Undo data to the VM backup image, and when the entry does not include Undo data, checking a next entry until all the entries in the LL IO journal have been checked, and then applying the entries in the LL IO journal to the VM backup image.

12. The non-transitory storage medium as recited in claim 11, wherein the LL IO journal spans a range of time [t−q, t+p], where 't−q' is a period of time of length 'q' preceding 't,' and 't+p' is a period of time of length 'p' following 't'.

13. The non-transitory storage medium as recited in claim 12, wherein the restore point 'r' falls within a period of time t−q.

14. The non-transitory storage medium as recited in claim 12, wherein the restore point 'r' falls within a period of time t+p.

15. The non-transitory storage medium as recited in claim 11, wherein the restore point 'r' is selected to pre-date a problem or other event known to have occurred in a computing system.

16. The non-transitory storage medium as recited in claim 11, wherein the VM is spun up at the restore point 'r'.

17. The non-transitory storage medium as recited in claim 11, wherein when the restore point 'r' is later in time than the backup time 't,' the entries in the LL IO journal are applied to the VM backup image in chronological order, beginning with the entry immediately following 't', up to, and including, the entry with timestamp 'r'.

18. The non-transitory storage medium as recited in claim 11, wherein after the entries in the LL IO journal have been applied to the VM backup image, the VM has been spun up to time 'r'.

19. The non-transitory storage medium as recited in claim 11, wherein the spun up VM is combined with the LL IO journal to create a Live VM image.

20. The non-transitory storage medium as recited in claim 11, wherein the Live VM image is created by applying the LL IO journal entries to the backup image of the VM.

* * * * *

UNITED STATES PATENT AND TRADEMARK OFFICE
CERTIFICATE OF CORRECTION

PATENT NO. : 12,417,152 B2  Page 1 of 1
APPLICATION NO. : 18/632166
DATED : September 16, 2025
INVENTOR(S) : Azaria et al.

It is certified that error appears in the above-identified patent and that said Letters Patent is hereby corrected as shown below:

On the Title Page

Item (57), Abstract
Line 10, change "at least one other entry in the journal" to – at least one other entry in the IO journal –

In the Specification

Column 2
Line 1, change "an journal" to – an IO journal –

Column 4
Line 54, change "I/O journal" to – IO journal –

Column 7
Line 2, change "an 10 written at time T1" to – an IO written at time T1 –

Column 12
Line 1, change "as recited in in any of" to – as recited in any of –
Line 4, change "as recited in in any of" to – as recited in any of –
Line 8, change "as recited in in any of" to – as recited in any of –
Line 15, change "as recited in in any of" to – as recited in any of –
Line 19, change "as recited in in any of" to – as recited in any of –
Line 24, change "as recited in in any of" to – as recited in any of –
Line 50, change "as recited in in any of" to – as recited in any of –

Signed and Sealed this
Tenth Day of February, 2026

John A. Squires
*Director of the United States Patent and Trademark Office*